(12) United States Patent
Weilant

(10) Patent No.: US 7,070,032 B2
(45) Date of Patent: Jul. 4, 2006

(54) HYDRODYNAMIC COUPLING APPARATUS

(75) Inventor: David Robert Weilant, Muncie, IN (US)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 10/850,029

(22) Filed: May 20, 2004

(65) Prior Publication Data
US 2005/0230211 A1 Oct. 20, 2005

Related U.S. Application Data

(60) Provisional application No. 60/563,051, filed on Apr. 16, 2004.

(51) Int. Cl.
*F16D 27/00* (2006.01)

(52) U.S. Cl. .................... 192/3.28; 192/21.5

(58) Field of Classification Search ........... 192/3.28, 192/3.29, 3.31, 21.5; 180/245, 247, 248, 180/249; 60/330, 341, 345, 347
See application file for complete search history.

(56) References Cited

U.S. PATENT DOCUMENTS

| | | | | |
|---|---|---|---|---|
| 4,632,207 | A | * | 12/1986 | Moore .................... 180/247 |
| 5,358,084 | A | * | 10/1994 | Schramm ................ 192/21.5 |
| 5,394,694 | A | * | 3/1995 | Doumov et al. .......... 60/363 |
| 5,518,095 | A | * | 5/1996 | Gassmann ................ 192/61 |
| 5,779,013 | A | | 7/1998 | Bansbach |
| 5,823,309 | A | | 10/1998 | Gopalswamy et al. |
| 5,845,753 | A | | 12/1998 | Bansbach |
| 6,334,832 | B1 | | 1/2002 | Heravi et al. |
| 6,371,267 | B1 | | 4/2002 | Kao et al. |
| 6,412,618 | B1 | | 7/2002 | Stretch et al. |
| 6,428,441 | B1 | | 8/2002 | Hunt |
| 6,454,674 | B1 | | 9/2002 | Krzesicki et al. |
| 6,527,661 | B1 | | 3/2003 | Leeper |
| 6,527,664 | B1 | | 3/2003 | Hunt |
| 2001/0041637 | A1 | | 11/2001 | Leeper |
| 2002/0119857 | A1 | | 8/2002 | Krzesicki et al. |
| 2002/0173400 | A1 | | 11/2002 | Hunt |
| 2003/0134707 | A1 | | 7/2003 | Goldie et al. |
| 2003/0155201 | A1 | | 8/2003 | Bowen |

* cited by examiner

FOREIGN PATENT DOCUMENTS

EP  0 940286  9/1999

OTHER PUBLICATIONS

Banks Power, Aaron Gold, Understanding Torque Converters, http://www.bankspower.com/Tech_understandtorqueconver.cfm.*

*Primary Examiner*—Saul Rodriguez
(74) *Attorney, Agent, or Firm*—Reising, Ethington, Barnes, Kisselle, PC.; Greg Dziegielewski

(57) ABSTRACT

A hydrodynamic coupling apparatus (10) for transmitting torque between driving and driven elements includes an input shaft (14), a first end (16) of which is rotatably supported in a case (12) and a second end (18) of which is connectable to a torque generator (20). A hydrodynamic clutch (22) is connected to the first end (16) of the input shaft (14) and includes an impeller (34) and a turbine (36) enclosed in a clutch housing (24). The impeller (34) is fixed to the first end (16) of the input shaft (14), and the turbine (36) is rotatably supported adjacent the impeller (34). Both the impeller (34) and the turbine (36) are immersed in magnetorheological fluid (30). An electromagnetic field generator (32) is supported adjacent the clutch housing (24) and is operable to generate a magnetic field in the magnetorheological fluid (30). The field generator is adjustable to adjust the density of the magnetic field flux and, consequently, the amount of torque transferred from the impeller (34) to the turbine (36).

24 Claims, 2 Drawing Sheets

US 7,070,032 B2

HYDRODYNAMIC COUPLING APPARATUS

CROSS-REFERENCES TO RELATED APPLICATIONS

This application claims priority from Provisional Application No. 60/563,051, filed Apr. 16, 2004 and entitled "Hydrodynamic Coupling Apparatus".

STATEMENT REGARDING FEDERALLY SPONSORED RESEARCH OR DEVELOPMENT

Not Applicable

BACKGROUND OF THE INVENTION

1. Field of the Invention

This invention relates generally to a hydrodynamic coupling apparatus for transmitting torque between driving and driven elements by dynamic fluid action.

2. Description of the Related Art Including Information Disclosed under 37 CFR 1.97 and 1.98

Hydrodynamic couplers that transmit torque between driving and driven elements by dynamic fluid action are known in the art. Also known are hydrodynamic coupling apparati that include magnetorheological fluid in a case between a driving element and a driven element. In such apparati an electromagnetic field generator is supported adjacent the case and is positioned to generate a magnetic field within the case and through the magnetorheological fluid to adjust the amount of torque transferred from the driving element to the driven element by adjusting the viscosity of the magnetorheological fluid. Magnetorheological fluid includes magnetic particles suspended within a carrier fluid and is in a liquid state when exposed to little or no magnetic field. When exposed to a magnetic field of increasing strength or flux density the magnetorheological fluid behaves as a Bingham solid, increasing in viscosity through rheological transformation. This occurs because the suspended magnetic particles migrate toward and along lines of magnetic flux to form chains.

An example of such an apparatus is disclosed in U.S. Pat. Nos. 5,779,013 and 5,845,753 issued 14 Jul. 1998 and 8 Dec. 1998, respectively, to Bansbach. Each of the Bansbach patents discloses a hydrodynamic coupling apparatus in the form of a torque transfer device for four-wheel-drive vehicles. Bansbach discloses the torque transfer device as including a transfer case and an input shaft having a first end rotatably supported within the transfer case and a second end connectable to a torque generator. The torque transfer device of the Bansbach patents also includes a driving element fixed to the first end of the input shaft and rotatably supported with the input shaft in the case. A driven element is rotatably supported in the case adjacent the driving element. Magnetorheological fluid is disposed within the case and between the driving element and the driven element and an electromagnetic field generating coil is supported adjacent the case where it generates a magnetic field in the magnetorheological fluid. The electromagnetic field flux density is adjusted to vary the amount of torque transferred from the driving element to the driven element.

Also, U.S. Pat. No. 5,823,309 issued 20 Oct. 1998 to Gopalswamy et al., discloses a hydrodynamic coupling apparatus in the form of a vehicle torque transmission device including a magnetorheological clutch. Similarly, U.S. Pat. No. 6,334,832B1 issued 1 Jan. 2002 to Heravi et al. discloses a limited slip differential that uses "smart" control incorporating magnetorheological fluid. U.S. Pat. No. 6,371,267B1 issued 16 Apr. 2002 to Kao et al. discloses a liquid cooled magnetorheological fluid clutch that provides torque transfer between an engine and a transmission of a vehicle. U.S. Pat. No. 6,412,618B1 issued 2 Jul. 2002 to Stretch et al. discloses a particle clutch for which the amount of transfer force is determined by using magnetic particles or a magnetorheological fluid. United States Patent Application Publication No. US2002/0173400 and U.S. Pat. Nos. 6,428,441B1 and 6,527,664B2 issued 21 Nov. 2002 and 6 Aug. 2002, respectively, to Hunt disclose an electromagnetic clutch including a magnetorheological operator and a ball ramp operator. United States Patent Application Publication No. US2002/0119857 and U.S. Pat. No. 6,454,674B1 issued 24 Sep. 2002 to Krzesicki et al. disclose a controllable magnetorheological fluid-based torque limiting device for use with a vehicle differential. United States Patent Application Publication No. US2001/0041637 and U.S. Pat. No. 6,527,661B2 issued 4 Mar. 2003 to Leeper disclose a limited slip differential incorporating magnetorheological fluid brake elements. United States Patent Application Publication No. US2003/0134707 of Goldie et al. discloses a transmission having continuously variable speed ratios using magnetorheological clutch assemblies. United States Patent Application Publication No. US2003/0155201 of Bowen discloses a transfer clutch that includes a magnetorheological actuator. European Patent Document EP 940,286 discloses magnetorheological fluid clutches for use in vehicles in which torque transfer is modulated by controlling electrical signals to the coil to vary the viscosity of the magnetorheological fluid.

Each of the above patents teaches the use of closely-spaced flat disks or annuli that are immersed in magnetorheological fluid. When the magnetorheological fluid is exposed to magnetic flux, the magnetorheological fluid is at least partially solidified and the disks or annuli are coupled to each other through the magnetorheological fluid. A magnetic field directed through the disks or annuli and disposed normal to the surfaces of the disks or annuli and provides shear load support of the solidified or nearly solidified magnetorheological fluid between the adjacent surfaces of the disks or annuli. This system cannot transmit torque without shear load support of solidified or nearly solidified magnetorheological fluid. Without electrical power there is no appreciable torque transfer.

Also known are damping systems that control noise, vibration, and harshness (NVH) in a vehicle power train by using rubber element drives or added rotational inertia to "tune" the power train. However, a device such as this is only able optimize or tune a power train in a limited operating range. As the system deviates from the optimum tuned conditions, system response degrades.

What is needed is a magnetorheological hydrodynamic coupling apparatus capable of transmitting torque even when electrical power is removed from the field generator and that requires less electrical power for a given amount of torque transfer. What is also needed is a hydrodynamic damper capable of optimizing or tuning a power train throughout a broad operating range.

BRIEF SUMMARY OF THE INVENTION

The invention is a hydrodynamic coupling apparatus for transmitting torque between driving and driven elements by dynamic fluid action. The apparatus includes a case and an input shaft having a first end rotatably supported within the case and a second end connectable to a torque generator. The hydrodynamic coupling apparatus also includes a clutch connected to the first end of the input shaft. The clutch includes a clutch housing carried by the case and a driving element fixed to the first end of the input shaft and rotatably supported with the input shaft in the clutch housing. The clutch also includes a driven element rotatably supported in the housing adjacent the driving element and magnetorheological fluid disposed in the housing and between the driving element and the driven element. An electromagnetic field generator is supported adjacent the clutch housing and is positioned to generate a magnetic field in the magnetorheological fluid. The electromagnetic field generator is adjustable to increase and decrease the density of the magnetic field flux, which increases and decreases the amount of torque transferred from the driving element to the driven element by increasing and decreasing the viscosity or "hardness" of the magnetorheological fluid.

Unlike the prior art, the driving element of the clutch includes an impeller and the driven element includes a turbine. The impeller has blades configured to rotate the turbine by propelling magnetorheological fluid against blades of the turbine. This allows for a softer, more fluid connection between the driving and driven elements than in current torque transmission devices using magnetorheological fluid, improving response to torque and speed perturbations. It can also improve heat rejection by maintaining a much higher rate of fluid circulation for a given amount of torque transmission. The use of an impeller and turbine arrangement also limits the amount of coil energizing electrical power needed to increase magnetorheological fluid viscosity due to the amount of additional torque transfer that the blading action of the turbine and impeller provide. This reduces or eliminates the need to depend on shearing action of the magnetorheological fluid to affect torque transfer. Another advantage of this arrangement is that the use of the impeller and turbine arrangement insures that a significant degree of torque transfer will take place even if the coil is unpowered.

According to another aspect of the invention the hydrodynamic coupling apparatus turbine is operably connected to an output shaft and is configured to transmit torque to the output shaft. With the turbine connected to an output shaft the apparatus is operable as a hydrodynamic drive.

According to another aspect of the invention a hydrodynamic coupling apparatus for transmitting torque between driving and driven elements by dynamic fluid action is provided that comprises a case, an input shaft having a first end rotatably supported within the case and a second end connectable to a torque generator. A clutch is connected to the first end of the input shaft and includes a clutch housing supported by the case and a driving element fixed to the first end of the input shaft and rotatably supported with the input shaft in the clutch housing. A driven element is also rotatably supported in the housing adjacent the driving element, and a magnetorheological fluid is disposed in the housing and between the driving element and the driven element. An electromagnetic field generator is supported adjacent the housing and is positioned to generate a magnetic field in the magnetorheological fluid, the electromagnetic field generator being adjustable to increase and decrease the density of the magnetic field flux. Further according to this aspect of the invention the field generator is positioned to generate an electromagnetic field that crosses the output member. The field creates pools of stagnant or inactive fluid that impede the fluid flow adjacent the output member. In other words, the field generator is positioned to provide localized viscosity changes around the output member to alter the fluid flow path in such a way as to cause the fluid to transfer more torque to the output member. This increases the potential torque output capacity of the apparatus for a given space, i.e., higher power density. It also provides better response to torque and speed perturbations.

According to another aspect of the invention a controller is connected to the field generator and is configured to control the density of the magnetic field flux produced by the field generator in response to data representing pulses and vibrations received from a sensor supported in a position to detect such pulses and vibrations. The controller is programmed to pulse the coil in such a way as to counter or dampen whatever pulses or vibration the sensor detects. This arrangement allows the apparatus to function as a damper/retarder in which the magnetorheological fluid provides interactive damping to cancel or modify vibrations and pulses in the drive train.

The invention also includes a method for transmitting torque between driving and driven elements by dynamic fluid action. According to this method, torque is input to a transfer case from an engine through a clutch input shaft so that the clutch input shaft rotates an impeller rotatably supported in a clutch housing. Rotating blades of the impeller propel magnetorheological fluid against the blades of a turbine causing the turbine and the clutch housing to rotate. The clutch housing is connected to an output sprocket so that rotation of the inner housing results in rotation of the output sprocket, which drives a chain that rotates an output shaft. The turbine blades also propel the fluid against the blades of a reactor, which results in a reactive impulse off the stator blades. The proportion of input torque that is passed from the input shaft to the output shaft is changed by changing the magnitude of the electromagnetic field induced by a coil positioned adjacent the clutch housing, which changes the viscosity of the magnetorheological fluid within the clutch housing.

The invention also includes a method for dampening vibration. According to this method one can dampen drive train vibration by first providing a hydrodynamic coupling apparatus comprising an input shaft having a first end rotatably supported within a clutch housing and carrying an impeller, and a turbine rotatably supported in the clutch housing adjacent the driving element and operably connected to an output shaft. Magnetorheological fluid is provided in the clutch housing and between the driving element and the driven element. An electromagnetic field generator is provided adjacent the clutch housing. Torque is then applied to the output shaft by rotating the turbine by propelling magnetorheological fluid against blades of the turbine by rotating the impeller by applying torque to the input shaft. A sensor is provided at a desired sensor location in the vehicle and a controller is connected to the sensor and to the field generator. A pulse or vibration at the sensor location is countered by causing the controller to energize the coil in response to a signal received from the sensor and corresponding to the vibration or pulse to be countered.

BRIEF DESCRIPTION OF THE SEVERAL VIEWS OF THE DRAWINGS

These and other features and advantages of the invention will become apparent to those skilled in the art in connection with the following detailed description and drawings, in which.

DETAILED DESCRIPTION OF INVENTION EMBODIMENT

Figure 1:
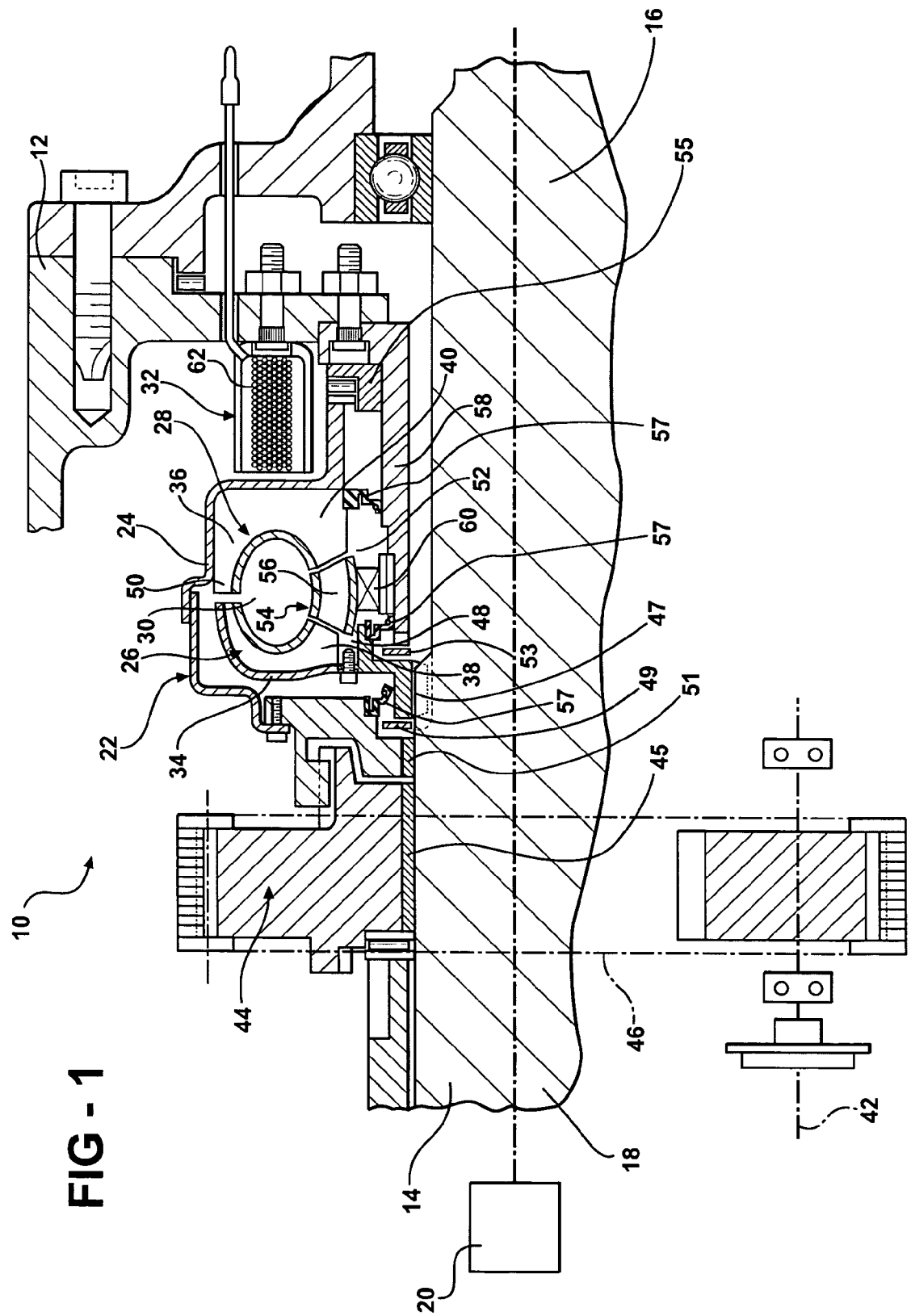
FIG. 1 is a schematic view of a drive train including a schematic cut-away view of a hydrodynamic drive constructed according to the invention.

A first embodiment of a hydrodynamic coupling apparatus for transmitting torque between driving and driven elements by dynamic fluid 30 action is generally shown at 10 in FIG. 1. A second embodiment is generally shown at 10' in FIG. 2. Reference numerals with the designation prime (') in FIG. 2 indicate alternative configurations of elements that also appear in first embodiment shown in FIG. 1. Unless indicated otherwise, where a portion of the following description uses a reference numeral to refer to FIG. 1, that portion of the description applies equally to elements designated by primed numerals in FIG. 2.

The apparatus 10 includes a case 12 and a torque input/output shaft 14 rotatably supported within the case 12 and having a first end 16 drivingly connectable to a drive axle and and a second end 18 connectable to a torque generator 20. The apparatus 10 also includes a hydrodynamic clutch 22 connected to the first end 16 of the torque input/output shaft 14. The hydrodynamic clutch 22 includes a clutch housing 24 that's carried by the case 12 and an input or driving element 26 of the clutch that's fixed to the first end 16 of the input/output shaft and is rotatably supported with the torque input/output shaft 14 in the clutch housing 24. A driven element 28 is also rotatably supported in the clutch housing 24 and adjacent the driving element 26. A magnetorheological fluid 30 is disposed in the housing and between the driving element 26 and the driven element 28. An electromagnetic field generator 32 is supported adjacent the housing and is positioned to generate a magnetic field in the magnetorheological fluid 30. The electromagnetic field generator 32 is adjustable to increase and decrease the density of the magnetic field flux. Increasing and decreasing magnetic field flux density increases and decreases the viscosity of the magnetorheological fluid 30 which increases and decreases the amount of torque transferred from the driving element 26 to the driven element 28.

The driving element 26 includes an impeller 34 and the driven element 28 includes a turbine 36. The impeller 34 includes impeller blades 38 that rotate the turbine 36 by propelling magnetorheological fluid 30 against turbine blades 40 of the turbine 36.

In the embodiment of FIG. 1, the apparatus 10 is integrated into an-wheel drive transfer case 86 and the case 12 is the outer casing of the transfer case 86. The apparatus 10 is configured to apportion torque between rear and front axles by controlling the magnetorheological fluid 30 filled hydrodynamic clutch 22. However, in other embodiments the hydrodynamic coupling apparatus 10 may be a stand alone unit having its own outer case that may be connectable to an all-wheel drive transfer case 86.

The turbine 36 is operably connected to an output shaft 42 which, in the case 12 of the present embodiment shown in FIG. 1, is a front output shaft 42 that transmits torque to a front axle in an all-wheel drive vehicle. The turbine 36 is configured to transmit torque to the front output shaft 42 such that the apparatus 10 is operable as a hydrodynamic drive. The torque input/output shaft 14 to the driving element 26 also serves as a rear output shaft that transmits torque to a rear axle of an all-wheel drive vehicle. In other words, torque is transmitted directly from the torque generator 20 to a rear axle by the torque input/output shaft 14, and the coupling apparatus 10 transfers torque from the torque input/output shaft 14 to the front output shaft 42.

The turbine 36 is positioned axially opposite the impeller 34 in the clutch housing 24 and is fixed to the clutch housing 24. The clutch housing 24 is fastened to a forward output sprocket 44 that drivingly engages a chain 46 that turns the output shaft 42. The forward output sprocket 44 is concentrically and rotatably supported on the input/output shaft 14 by a first bushing 45. Similarly, the clutch housing 24 is supported on the input/output shaft 14 by a second bushing 51.

The hydrodynamic clutch 22 is carried by the case 12 and surrounds the torque input/output shaft 14. The clutch impeller 34 is connected to the torque input/output shaft 14 via a spline arrangement 47 and rotates with the torque input/output shaft 14, being spaced from the clutch housing by a first thrust washer 49. As such, the impeller 34 and turbine 36 are reversed relative to what their positions would be in a conventional torque converter. In a conventional torque converter the impeller 34 would be splined to an input shaft of an automatic transmission and a housing of the torque converter that carries the fins of the pump or impeller 34 would be bolted to an engine flywheel 84. This reversal is significant because it allows the electromagnetic field generator 32 to be conveniently fixed relative to the case 12 while being positioned more immediately adjacent the reactive element, i.e., the turbine 36. As is explained below, more torque can be transferred by using a magnetic field to increase the viscosity of the magnetorheological fluid around the turbine blades 40. If it were a typically positioned impeller, the magnetorheological fluid surrounding the impeller 34 would be more directly affected instead of the fluid surrounding the turbine 36. In addition, the incorporation of a torque converter into the power flow path of a four-wheel-drive transfer case necessitates the reversal of driving and driven elements of the torque converter. Conventionally, the power flow path of a torque converter is from outside (the engine flywheel/torque converter shell/impeller) to inside (turbine/automatic transmission input). However, when installed in a four-wheel-drive transfer case, the transmission input (torque input/output shaft 14) is in a very confined space. This necessitates a power flow path from the inside to the outside, which requires the driving element (impeller 34) to be on the inside and the driven element (turbine 36) to be on the outside such that the power output elements (sprocket 44, and chain 46) are piloted externally.

The impeller 34 is a centrifugal turbine 36 that, as it spins, flings the magnetorheological fluid 30 radially outward creating a vacuum that draws more fluid 30 into the impeller 34 at a radial center 48 of the impeller 34. The fluid 30 then enters a radially outer periphery 50 of the turbine 36 contacting the turbine blades 40, which are generally radially oriented such that impingement of the fluid 30 caused the turbine 36 to spin. The turbine blades 40 are curved such that the fluid 30 has to change rotational direction before it exits near a radial center 52 of the turbine 36. As a result, the fluid 30 exits the turbine 36 at the center 52 of the turbine 36 moving in a rotational direction opposite the direction of impeller 34 rotation. As such, if the fluid 30 exiting the turbine 36 were allowed to impinge on the impeller 34, it would slow the impeller 34, wasting power.

To prevent this waste of power a reactor 54 is carried by the case 12 and is disposed co-axially and rotatably supported between the impeller 34 and the turbine 36. The reactor 54 is configured to redirect the magnetorheological fluid 30 as the fluid 30 returns to the impeller 34 from the turbine 36 and before the fluid 30 impinges on the impeller 34. The reactor 54 includes blades 56 shaped to almost completely reverse the direction of the fluid 30 exiting the impeller 34.

The case 12 carries a reactor support 58 that carries a concentrically disposed one-way clutch 60 and is spaced from the clutch impeller 34 by a second thrust washer 53. The reactor support also carries a thrust bearing 55 that supports one end of the clutch housing 24 for rotation. The one-way clutch 60 restricts reactor 54 rotation to the direction of impeller 34 rotation. As a result, the reactor 54 is unable to spin with the magnetorheological fluid 30 exiting the impeller 34. It can only spin in the opposite rotational direction, forcing the magnetorheological fluid 30 to change direction when the fluid 30 hits the reactor 54 blades and before it hits the turbine blades 40. As such, if the reactor 54 is overloaded, the one-way clutch 60 allows the reactor 54 to freewheel in only one direction. Without the presence of electromagnetically controllable magnetorheological fluid 30 the reactor 54 would be necessary to make the apparatus 10 operable as a torque converter, i.e., as a hydrodynamic drive having the ability to change the amount of torque transmitted from the impeller 34 to the turbine 36 of the hydrodynamic clutch 22. Without either the magnetorheological fluid 30 or the one way clutch, the apparatus 10 would merely be operable as a fluid 30 coupling, i.e., as a hydrodynamic drive without the ability to change the amount of torque transmitted from the impeller 34 to the turbine 36 of the hydrodynamic clutch 22. The one-way clutch 60 may be of any suitable variety to include the roller or Sprague variety. A roller clutch uses cylindrical elements that engage cam profiles while the Sprague clutch uses cam profile locking elements that engage inner and outer races.

The magnetorheological fluid 30 fills a generally torroidal-shaped void defined by the reactor support 58 and the clutch housing 24. The impeller 34, the turbine 36, and the reactor 54 are supported in this void and are all immersed in the magnetorheological fluid 30. To prevent the fluid from escaping the void, three ring seals 57 are positioned between the impeller 26 and the clutch housing 24, between the clutch housing 24 and the reactor support 58, and between the impeller 26 and the reactor support 58, respectively.

The electromagnetic field generator 32 includes a torroidal coil 62 carried by the case 12 and positioned adjacent and parallel to the immersed impeller 34, turbine 36, and reactor 54 in a position to generate an electromagnetic field in an at least a portion of the magnetorheological fluid 30 immersing the impeller 34, turbine 36, and reactor 54. This allows an operator to control magnetorheological fluid 30 viscosity by modulating power to the coil 62, which changes the electromagnetic field flux density and thus, the viscosity of the magnetorheological fluid 30. Such coils 62 are also present in prior art all-wheel drive transfer cases but, unlike a case constructed according to the present invention, current cases also have an armature plate that rotates adjacent the coil 62 so that an increase in the density of the electromagnetic field flux induced by the coil 62 increases resistance between the coil 62 and the armature plate. In the present invention, however, it's not necessary for the housing to be influenced by the coil 62. Instead, when the coil 62 is energized, the viscosity of the magnetorheological fluid 30 increases, causing the impeller 34 to more directly influence turbine 36 rotation and resulting in an increase in the proportion of torque transferred to the front output shaft 42.

The field generator 32 is positioned to generate an electromagnetic field that crosses the turbine 36. The field is generated across the turbine 36 to create pools of stagnant or inactive magnetorheological fluid 30 adjacent the turbine blades 40, thereby impeding fluid 30 flow adjacent the turbine 36. In other words, the field generator 32 is positioned to provide localized viscosity changes around the turbine 36 to alter the fluid 30 flow path in such a way as to cause the fluid 30 to act more like a solid mechanical member and to thus transfer more torque to the turbine 36.

In practice, torque is transmitted between driving and driven elements according to the embodiment of FIG. 1 by applying torque from an engine through the torque input/output shaft 14 so that the torque input/output shaft 14 rotates the impeller 34 in the clutch housing 24. The rotating impeller blades 38 then propel magnetorheological fluid 30 against the turbine blades 40 causing the turbine 36 and the clutch housing 24 to rotate. The clutch housing rotation causes the output sprocket 44 to rotate which drives the chain that rotates the output shaft 42. The turbine blades 40 also propel the magnetorheological fluid 30 against the blades of the reactor 54, which causes a reactive impulse off the reactor 54 blades. The proportion of input torque that passes from the torque input/output shaft 14 to the output shaft 42 is changed by changing the viscosity of the magnetorheological fluid 30 within the clutch housing 24 and, in particular, surrounding the turbine 36. This is accomplished by changing the magnitude or density of the electromagnetic field flux induced by the coil 62.

Figure 2:
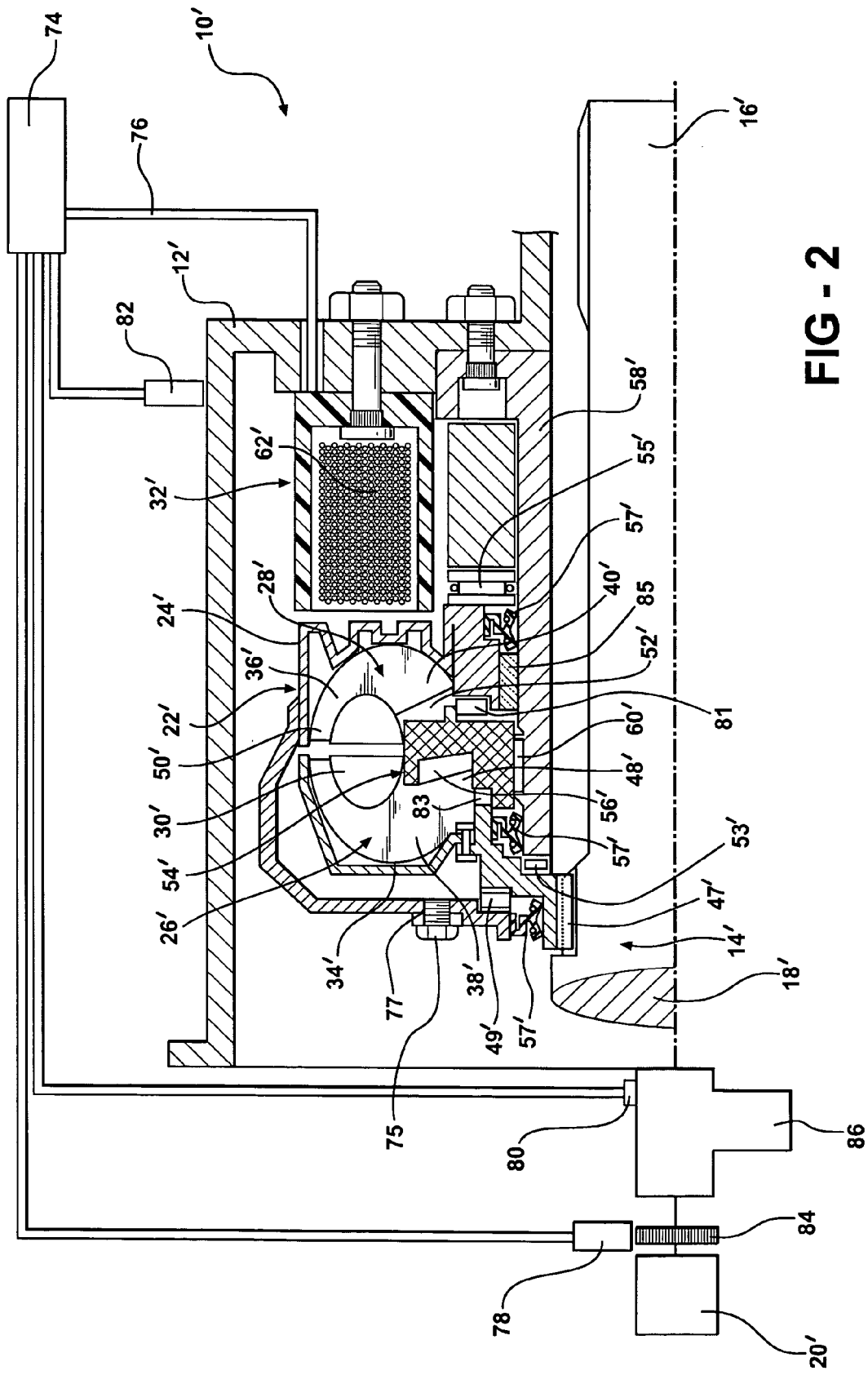
FIG. 2 is a schematic view of a drive train including a schematic cutaway view of a damper/retarder constructed according to the invention.

According to the embodiment shown in FIG. 2, the apparatus 10' includes a controller 74 connected to the field generator 32' by a control line 76. The controller 74 is programmed to control the density of the magnetic field flux that the field generator 32' produces in response to data that the controller 74 receives representing torque oscillations and torque pulses sensed in a drive train that the apparatus 10' is incorporated into. The controller 74 is also programmed to control magnetic field flux density in response to vibrations sensed either in the apparatus 10' itself, a drive train connected to the apparatus 10', or in a vehicle supporting the apparatus 10'. The clutch housing 24' of this embodiment isn't connected to an output shaft or sprocket as in the embodiment of FIG. 1 and, as a result, the apparatus 10' in the embodiment of FIG. 2 has no torque output. Instead, the apparatus 10' functions as a damper/retarder in which magnetorheological fluid 30' occupying the clutch housing 24' provides interactive damping to cancel or modify vibrations, torque oscillations, and torque pulses. Rather than changing the amount of power input to the coil 62' to control the proportion of torque transferred to an output shaft, the controller 74 modulates input power to the coil 62' as necessary to cancel or limit vibrations, torque oscillations, and torque pulses. This is done using the controller 74 and three sensors 78, 80, 82 that detect torque oscillations and pulses and vibrations. In response to inputs from one or more of these sensors, the controller 74 modulates electrical power to the coil 62' through the control line 76, which modulates the viscosity or hardness of the magnetorheological fluid 30 as necessary to cancel or limit whatever vibrations or torque oscillations and pulses that the sensors 78, 80, 82 detect.

One of the three sensors is an engine sensor 78 supported in a position where it can detect engine torque pulses. The controller 74 is programmed to pulse the coil 62' in such a way as to cancel or at least partially counter any engine torque pulses or oscillations in response to signals received from the engine sensor 78. The engine sensor 78 is preferably a Hall Effect sensor supported adjacent an engine flywheel 84.

A second one of the three sensors is a transfer case sensor 80 supported in a position on a transfer case 86 where it can detect transfer case vibrations. The controller 74 is programmed to pulse the coil 62' in such a way as to cancel or partially counter transfer case 86 vibrations in response to signals received from the transfer case sensor 80. The transfer case sensor 80 is preferably a laser accelerometer but may be any suitable sensor known in the art.

A third one of the three sensors is a damper case sensor 82 is supported in a position on the damper case 12' where it can detect damper case vibration. The controller 74 is programmed to pulse the coil 62' in such a way as to cancel or partially counter damper case vibrations in response to signals received from the damper case sensor 82. In the embodiment shown in FIG. 2, the damper case 12' is schematically shown as being attached to a transfer case 86. However, in other embodiments, the damper case 12' may be carried inside an all-wheel drive transfer case 86 or be integrally formed as a single piece with the outer casing of a transfer case 86. The damper case sensor 82 is preferably a laser accelerometer but can be any other suitable type of sensor known in the art.

In other embodiments either the transfer case sensor 80 or damper case sensor 82 may be used, or both may be used. Including sensors at both locations provides the controller with different views of the vibratory modes in a drive train that the apparatus 10' is connected to. It is preferable to use sensors in more than one location on a drive train because drive trains characteristically have complex mode of vibrations that vary along the drive train. As such, a controller can more comprehensively assess and counter drive train vibration by drawing on information gathered from multiple sensor locations.

In practice, drive train torque oscillations, torque pulses and vibration can be dampened using the damper/retarder embodiment shown in FIG. 2 by allowing a torque generator such as an engine to apply torque to the torque input/output shaft 14', causing the impeller 34' supported on the torque input/output shaft 14' to rotate within the clutch housing 24'. Impeller rotation causes the impeller blades 38' to propel magnetorheological fluid 30' against the turbine blades 40', causing the turbine 36' to rotate. When the sensors 80, 82, 84 detect torque oscillations, torque pulses and/or vibrations in the drive train the sensors transmit corresponding signals to the controller 74. Once the controller 74 receives these signals the controller 74 reacts in accordance with its programming to counter those oscillations, pulses, and vibrations by energizing the coil 62' in such a way as to adjust electromagnetic field flux density and therefore magnetorheological fluid viscosity in such a way as to dampen or eliminate any detected oscillations, pulses, and/or vibrations.

What is claimed is:

1. A hydrodynamic coupling apparatus (10) for transmitting torque between driving and driven elements by dynamic fluid action, the apparatus comprising:
    a case (12);
    an input shaft (14) having a first end (16) rotatably supported within the case (12) and a second end (18) connectable to a torque generator (20);
    a hydrodynamic clutch (22) connected to the first end (16) of the input shaft (14) and including:
        a clutch housing (24) carried by the case (12);
        a driving element (26) fixed to the first end (16) of the input shaft (14) and rotatably supported with the input shaft (14) in the clutch housing (24);
        a driven element (28) rotatably supported in the clutch housing (24) adjacent the driving element (26),
        magnetorheological fluid (30) disposed in the clutch housing (24) and between the driving element (26) and the driven element (28);
        an electromagnetic field generator (32) positioned to generate a magnetic field in the magnetorheological fluid (30), the electromagnetic field generator (32) being adjustable to increase and decrease flux density of the magnetic field; and
    the driving element (26) including an impeller (34) and the driven element (28) including a turbine (36), the impeller (34) having blades configured to rotate the turbine (36) by propelling magnetorheological fluid (30) against blades of the turbine (36).

2. A hydrodynamic coupling apparatus (10) as defined in claim 1 in which the turbine (36) is operably connected to an output shaft (42) and is configured to transmit torque to the output shaft (42).

3. A hydrodynamic coupling apparatus (10) as defined in claim 2 in which:
    the clutch housing (24) is drivingly connected to an output sprocket (44);
    the turbine (36) is positioned axially opposite the impeller (34) and is fixed to the clutch housing (24); and
    the output sprocket (44) is drivingly connected to the output shaft (42).

4. A hydrodynamic coupling apparatus (10) as defined in claim 1 in which the impeller (34) is splined to the input shaft (14) and rotates with the input shaft (14).

5. A hydrodynamic coupling apparatus (10) as defined in claim 2 in which the input shaft (14) to the driving element (26) is also an output shaft.

6. A hydrodynamic coupling apparatus (10) as defined in claim 5 in which the apparatus (10) is configured to apportion torque between rear and front axles of a vehicle by controlling the magnetorheological fluid (30)-filled hydrodynamic clutch (22); the output shafts being configured to drivingly connect to respective ones of the front and rear axles of a vehicle.

7. A hydrodynamic coupling apparatus (10) as defined in claim 1 in which the impeller (34) is a centrifugal turbine (36).

8. A hydrodynamic coupling apparatus (10) as defined in claim 1 in which a reactor (54) is carried by the case (12), is disposed between the impeller (34) and the turbine (36), and is configured to redirect the magnetorheological fluid (30) as the fluid (30) returns to the impeller (34) from the turbine (36) and before the fluid (30) impinges on the impeller (34).

9. A hydrodynamic coupling apparatus (10) as defined in claim 8 in which the case (12) carries a one-way clutch (60) that carries the reactor (54) and is configured to increase torque output and prevent slippage curing coast conditions.

10. A hydrodynamic coupling apparatus (10) as defined in claim 9 in which the one-way clutch (60) is configured to restrict reactor (54) rotation to the direction of impeller (34) rotation.

11. A hydrodynamic coupling apparatus (10) as defined in claim 1 in which the impeller (34), the turbine (36), and the reactor (54) are all immersed in the magnetorheological fluid (30).

12. A hydrodynamic coupling apparatus (10) as defined in claim 11 in which the electromagnetic field generator (32) includes a coil (62) carried by the case (12) and positioned adjacent the immersed impeller (34), turbine (36), and reactor (54) in a position to generate an electromagnetic field in the magnetorheological fluid (30) immersing the impeller (34), turbine (36), and reactor (54).

13. A hydrodynamic coupling apparatus (10) as defined in claim 1 in which the field generator (32) is positioned to generate an electromagnetic field that crosses and is localized at the turbine (36), localizing viscosity changes in the magnetorheological fluid adjacent the turbine (36) and allowing relatively lower fluid viscosities to exist in the magnetorheological fluid adjacent the impeller (34).

14. A hydrodynamic coupling apparatus (10) as defined in claim 1 in which an external heat exchanger (64) is in fluid (30) communication with the clutch housing (24) and is configured to cool the magnetorheological fluid (30).

15. A hydrodynamic coupling apparatus (10') as defined in claim 1 further including a controller (74) connected to the field generator (32') and configured to control the flux density of the magnetic field produced by the field generator (32') in response to data representing pulses and vibrations.

16. A hydrodynamic coupling apparatus (10') as defined in claim 15 in which:
   an engine sensor (78) is supported in a position to detect engine torque pulses; and
   the controller (74) is programmed to pulse the coil (62') in such a way as to counter the engine torque pulses in response to signals received from the engine sensor (78).

17. A hydrodynamic coupling apparatus (10') as defined in claim 15 in which:
   a transfer case sensor (80) is supported in a position to detect transfer case (86) vibrations; and
   the controller (74) is programmed to pulse the coil (62') in such a way as to counter transfer case vibrations in response to signals received from the transfer case sensor (80).

18. A hydrodynamic coupling apparatus (10') as defined in claim 15 in which:
   a damper case sensor (82) is supported in a position to detect damper case vibrations; and
   the controller (74) is programmed to pulse the coil (62') in such a way as to counter damper case (12') vibrations in response to signals received from the damper case sensor (82).

19. A hydrodynamic coupling apparatus as defined in claim 13 in which convolutions are formed into the clutch housing and are configured to further localize the magnetic field in the vicinity of the turbine.

20. A hydrodynamic coupling apparatus (10) for transmitting torque between driving elements (26) by dynamic fluid action, the apparatus (10) comprising:
   a case (12);
   an input shaft (14) having a first end (16) rotatably supported within the case (12) and a second end (18) connectable to a torque generator (20);
   a hydrodynamic clutch (22) connected to the first end (16) of the input shaft (14) and including:
      a clutch housing (24) supported by the case (12);
      an impeller (34) fixed to the first end (16) of the input shaft (14) and rotatably supported with the input shaft (14) in the clutch housing (24);
      a turbine (36) rotatably supported in the clutch housing (24) adjacent the impeller, a magnetorheological fluid (30) disposed in the clutch housing (24) and between the impeller and the turbine, the impeller (34) having blades configured to rotate the turbine by propelling magnetorheological fluid (30) against blades (40) of the turbine (36); and
      an electromagnetic field generator (32) positioned to generate a magnetic field in the magnetorheological fluid (30), the electromagnetic field generator (32) being adjustable to increase and decrease the flux density of the magnetic field; and
   the field generator (32) is further positioned such that the magnetic field crosses and is localized at the turbine, localizing viscosity changes in the magnetorheological fluid adjacent the turbine and allowing relatively lower fluid viscosities to exist in the magnetorheological fluid adjacent the impeller.

21. A hydrodynamic coupling apparatus as set forth in claim 20 in which convolutions are formed into the clutch housing and are configured to further localize the magnetic field in the vicinity of the turbine.

22. A method for transmitting torque between driving and driven elements by dynamic fluid (30) action, the method including the steps of:
   providing a hydrodynamic coupling apparatus (10) comprising an input shaft (14) having a first end (16) rotatably supported within a clutch housing (24), an impeller (34) carried by the input shaft (14) within the clutch housing (24), and a turbine (36) rotatably supported in the clutch housing (24) adjacent the driving element (26) and operably connected to an output shaft (42);
   providing magnetorheological fluid (30) in the clutch housing (24) and between the driving element (26) and the driven element (28);
   providing an electromagnetic field generator (32) adjacent the magnetorheological fluid;
   applying torque to the output shaft (42) by rotating the turbine (36) by propelling magnetorheological fluid (30) against blades of the turbine (36) by rotating the impeller (34) by applying torque to the input shaft (14); and
   adjusting the proportion of torque passed from the input shaft (14) to the output shaft (42) by changing the viscosity of the magnetorheological fluid (30) by causing the field generator (32) to change the magnitude of the electromagnetic field.

23. A method for transmitting torque between driving and driven elements by dynamic fluid action as recited in claim 22 and in which:
   the step of providing an electromagnetic field generator adjacent the clutch housing includes positioning the field generator such that its magnetic field crosses and is localized at the turbine, localizing viscosity increases in the magnetorheological fluid adjacent the turbine and allowing relatively lower fluid viscosities to exist in the magnetorheological fluid adjacent the impeller; and
   the step of adjusting the proportion of torque includes changing the viscosity of the magnetorheological fluid adjacent the turbine by causing the field generator to change the magnitude of the electromagnetic field localized at the turbine.

24. A method for dampening vibration including the steps of:
   providing a hydrodynamic coupling apparatus (10') in a drive train, the apparatus (10') comprising an input shaft (14') having a first end (16') rotatably supported within a housing and carrying an impeller (26'), and a turbine (28') supported in the housing adjacent the impeller (26');
   providing magnetorheological fluid (30') in the housing and between the impeller (26') and the turbine (28');

providing an electromagnetic field generator (32') adjacent the magnetorheological fluid;
providing a sensor (78), (80), (82) at a desired sensor location in the drive train;
providing a controller (74) and connecting the controller (74) to the sensor and to the field generator (32');
applying torque to the input shaft (14') to rotate the driving element (26');
countering a torque oscillation, pulse, or vibration detected at the sensor location by causing the controller (74) to energize the coil (62') in response to a corresponding signal received from the sensor; and
positioning the field generator such that its magnetic field crosses and is localized at the turbine, localizing viscosity increases in the magnetorheological fluid adjacent the turbine and allowing relatively lower fluid viscosities to exist in the magnetorheological fluid adjacent the impeller.

* * * * *